United States Patent [19]

Harlan et al.

[11] 3,765,685

[45] Oct. 16, 1973

[54] RECORD MODE RELEASE MECHANISM

[75] Inventors: Alfred R. Harlan, Glendale Heights, Ronald E. Petersen, Des Plaines, both of Ill.

[73] Assignee: Motorola, Inc., Franklin Park, Ill.

[22] Filed: Dec. 6, 1971

[21] Appl. No.: 205,229

[52] U.S. Cl. .................. 274/4 E

[51] Int. Cl. .................. G11b 15/24

[58] Field of Search .................. 274/4 C, 4 B, 4 E; 242/198, 55.19 A; 179/100.2 Z

[56] References Cited

UNITED STATES PATENTS

| | | | |
|---|---|---|---|
| 3,475,031 | 10/1969 | Kuehnlein | 274/4 E |
| 3,395,871 | 8/1968 | Ackermann et al. | 274/4 E |
| 3,429,579 | 2/1969 | Hoag | 179/100.2 R |
| 3,689,077 | 9/1972 | Ohira | 274/4 E |

*Primary Examiner*—Harry N. Haroian
*Attorney*—Vincent J. Rauner et al.

[57] ABSTRACT

A mode selector release mechanism for a cassette tape player-recorder includes a first slidable arm member movable between first and second positions in accordance with the movement of a cassette from an inoperative to an operative position and vice versa, respectively. A resiliently mounted cam is attached to the slidable arm for engagement with a lever arm. Movement of the slidable arm to the first position places the cam in a predetermined relation with respect to the lever arm and movement of the slidable arm to the second position in response to the movement of the cassette from the operative to the inoperative position, causes engagement of the cam with the lever arm to pivot the latter. Pivotal movement of the lever arm causes it to engage another pivotal member holding the mode selector in a record condition. Engagement of the last-mentioned pivotal member releases the mode selector to return it to a non-record condition.

8 Claims, 9 Drawing Figures

RECORD MODE RELEASE MECHANISM

BACKGROUND

This invention relates generally to tape player-recorders and more particularly to tape player-recorders of the cassette type.

In cassette type tape player-recorders, there is conventionally provided a mode control member which is used to select the mode of operation of the player-recorder. Movement of the control member to one position operates the tape playing and recording instrumentalities to a playback condition and movement of the control to another position operates the instrumentalities to a record condition.

Often in cassette tape player-recorders of the type described, no provision is made to remove automatically, the mode control member from a record mode subsequent to removing a cassette from the player-recorder. Thus, one must rely only on his memory to do the latter. If one should forget to manually change the mode of operation of the player-recorder and insert a second tape cassette thereinto for playback, there is a possibility that information recorded on the tape will be lost in re-recording. If the information is irreplaceable, it will be lost forever.

SUMMARY

Accordingly, it is a general object of the present invention to provide a tape player-recorder of the cassette type in which the mode control selector is automatically moved out of the record position upon ejecting a cassette therefrom.

It is a more specific object of the present invention to provide in a tape player-recorder of the cassette type, a new and improved mechanism to move the mode control selector out of the record mode in response to the removal of a tape cassette from the player-recorder.

It is yet another object of the present invention to provide a mechanism of the last described type which is relatively simple in construction and efficient and reliable in operation.

Briefly, a preferred embodiment of a mode selector release mechanism according to the invention includes a first slidable arm member movable between first and second positions in accordance with the movement of a cassette into an inserted or ejected position in the player-recorder, respectively. A cam member mounted on a leaf spring is moved into a notch provided in a mode control disengage lever arm upon moving the cassette to an inserted position, and removed from the notch in response to the movement of the cassette to the ejected position. The cam in the latter case forces the lever arm to be pivoted to raise an interlock arm which releases the mode selector from a depressed, record position. A snap-action switch held operated by the mode selector when the latter is in a record condition, is released also to interrupt a holding circuit for a cassette eject mechanism included in the player-recorder.

DETAILED DESCRIPTION

Figure 1:
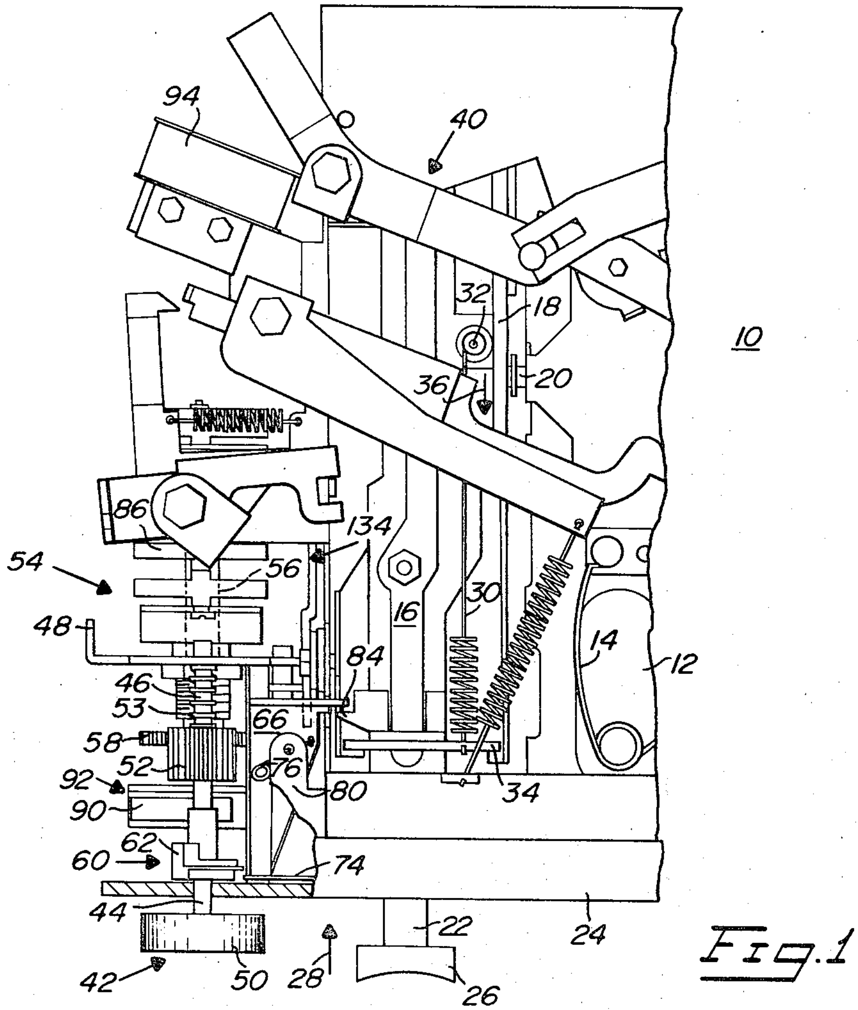
FIG. 1 is a top, plan view of a cassette type tape player-recorder incorporating a mode selector release mechanism according to the invention.

Referring now to the drawings in greater detail, wherein like numerals have been employed throughout the various views to designate similar parts, there is illustrated in FIG. 1, a cassette type tape player-recorder designated generally by the numeral 10 and incorporating therein a mode selector release mechanism according to the invention.

The cassette player-recorder is of the conventional type including a cassette or cartridge receiving tunnel 11 (FIG. 3) in which there is mounted a carriage 12. A cassette inserted into the tunnel and received in carriage 12 is drawn into the latter by the action of an overcenter spring 14. An actuator bar 16 is provided adjacent carriage 12 and is coupled thereto by an actuator arm 18 into which a pin 20 extending from the carriage is inserted. A free end 22 of the actuator bar extends outwardly through front plate 24 of the player-recorder and includes a knob 26 thereon. Depression of knob 26 in the direction of arrow 28 against the force of a return spring 30 connected to bar 16 at pin 32 and to a stationary tab 34 extending upwardly from the internal structure of the player-recorder causes arm 18 to move in the opposite direction, indicated by arrow 36, to drop carriage 12 downwardly (into the page as seen in FIG. 1) to an operable position on tape driving spindles (not shown). In addition, a magnetic tape head (not shown) for recording and/or playing back information on the tape is moved toward the tape cassette for engagement with a magnetic tape mounted therein.

The actuator bar 16 is returned to its initial position by coil spring 30 leaving actuator arm 18 and carriage 12 in the operated and lowered positions, respectively. A second depression of actuator bar 16 moves actuator arm 18 in a direction opposite arrow 36 and returns carriage 12 to the initial or inoperative position.

Other instrumentalities, designated by the numeral 40, for ejecting a cassette from the player-recorder when power thereto is removed, etc., are provided. A detailed description of the latter will not be provided herein. For a description of the last-mentioned instrumentalities as well as a tape player device similar to the one described herein, see copending U.S. Pat. application, Ser. No. 158,752, entitled "Automatic Eject Mechanism for Cassette Tape Player," in the name of Alfred R. Harlan and assigned to the same assignee as the instant invention.

The cassette player-recorder further includes a mode selector control designated generally by the numeral 42. The control comprises a shaft 44 extending outwardly from the player-recorder through front plate 24. The opposite end 46 of the shaft is mounted for rotation in a support plate 48 extending outwardly from the side of player-recorder 10 parallel to front plate 24. A control knob 50 is provided on the outwardly extending end of shaft 44 for making manual adjustments. A gear member 52 is mounted on the shaft 44 for rotation therewith, and a coil spring member 53 is also mounted on the shaft and is held between plate 48 and gear 52 to bias the control knob normally outwardly.

Mounted on plate 48 beneath the control shaft 50 is a rotary switch 54. A central wiper shaft 56, shown in dotted lines in FIG. 1, extends through plate 48 and a circular gear 58 is mounted on the end thereof in meshing engagement with gear 52 on mode control shaft 44. The rotary switch changes electrically the mode of operation of the instrumentalities in the tape player-recorder for recording and/or playing back information on a tape cassette received therein.

A generally cylindrical cam member 60 (See FIGS. 4–6) is also mounted on shaft 44 for rotation therewith. The cam member 60 includes a radially outwardly extending lobe 62 which, as will be explained in greater detail hereinafter, permits depression of actuator bar 22 when the mode selector is rotated to a playback position or is moved to a record position. The cam member further includes a "lip" or edge 64 formed about the periphery thereof.

An interlock arm 66 (See FIGS. 4–6) is mounted adjacent the cam member 60. Interlock arm 66 includes a first cylindrical portion 68 from which there extends a projection 70 positioned for engagement with lobe 62 of cam member 60. A pin 72 extends axially through the cylindrical portion 68 of the arm 66 and is received in plate 48 in a second mounting plate 74 (FIG. 1) positioned in parallel alignment with an adjacent from plate 24. The interlock arm is pivotal on pin 72 and is resiliently biased downwardly (into the page as seen in FIG. 1) by means of a biasing spring 76 coupled to an extension portion 78 of the interlock arm extending in the opposite direction from projection 70, and to a stationary plate 80 mounted thereabove.

The mode control selector 42 is movable to at least three different positions to program the tape player-recorder to playback, record-ready and record conditions.

Figure 3:
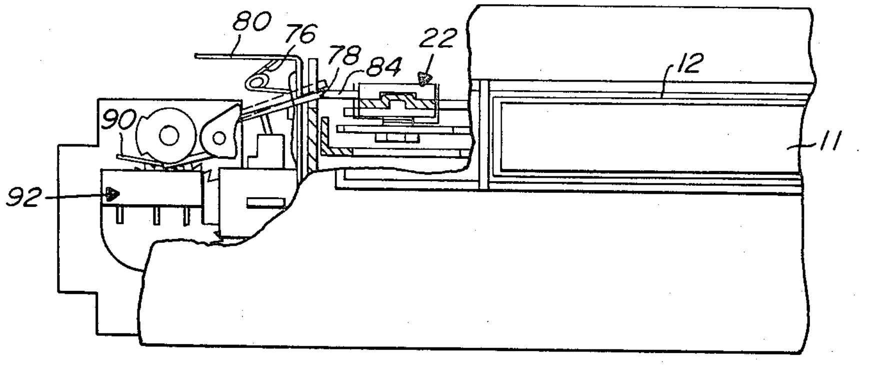
FIG. 3 is a fragmentary, cutaway, front view of the player-recorder of FIG. 1.
Figures 4, 5, 6:
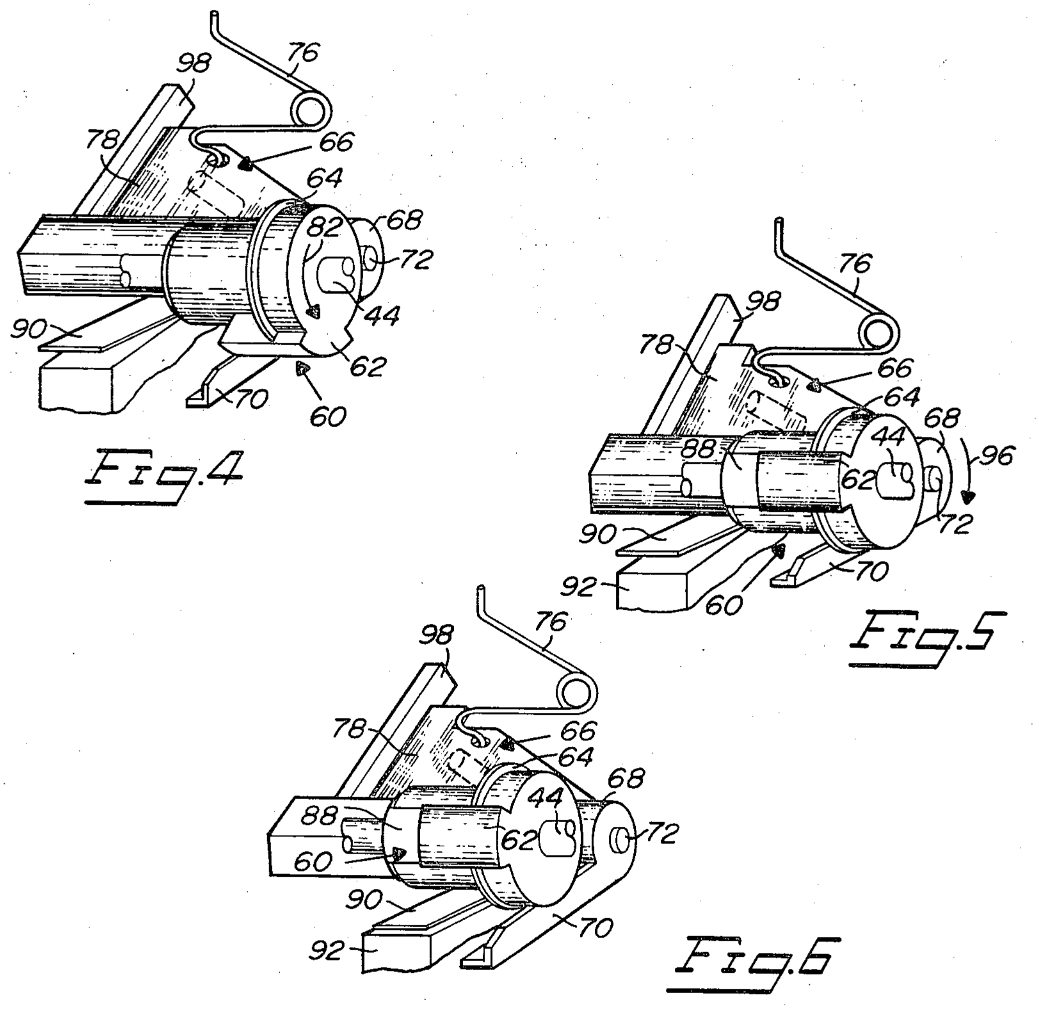
FIGS. 4–6 are enlarged, perspective views of an interlock arm and cam member mounted on the mode selector shaft of the player-recorder of FIG. 1 illustrating the positions of the last-mentioned members with respect to each other in the various operational conditions.

The three positions are illustrated in FIGS. 4–6. Referring to FIG. 4, the cam member 60 is shown rotated to a playback position. In this position, the control mode knob 50 is turned in the direction of arrow 82 so that lobe 62 engages projection 70 of interlock arm 66 pivoting the last-mentioned arm in the same direction so that the extension portion 78 thereof is moved into a position shown in dotted lines in FIG. 3, out of the path of a projection 84 extending from actuator bar 22. Likewise, the wiper shaft 56 of rotary switch 54 is positioned to cause wipers (not shown) mounted thereon to make electrical contact with the various terminals on wafers such as 86, to place the tape player-recorder intrumentalities electrically in the playback condition. With extension 78 lifted as shown in FIG. 3, the actuator arm 22 is free to be depressed inwardly of player-recorder 10 for lowering a cassette received in carriage 12 onto the drive spindles to play back information recorded thereon.

A flattened area 88 of the cam member 60 adjacent lobe 62 becomes aligned with the actuator arm 90 of a snap-switch 92 mounted therebeneath. The snap-switch when operated by depression of actuator 90 (into the page as seen in FIG. 1) completes an electrical circuit used in the record mode of operation to enable the energization of a solenoid 94 of the cartridge or cassette eject mechanism 40, thereby to permit operation of the player-recorder in the record mode (See FIG. 7). The circuit of FIG. 7 will be explained in greater detail hereinafter. In the event the control knob is depressed inadvertently while in the playback position, the flattened portion avoids actuation of the snap-switch.

Rotation of knob 50 in the direction opposite from arrow 82 (FIG. 4) takes the mode control selector out of the playback position and places it in a record-ready position (See FIG. 5). In the latter position, lobe 62 is disengaged from projection 70 of the interlock arm, permitting the last-mentioned arm to be pivoted in the direction of arrow 96 (FIG. 5) by spring 76, whereby arm 98 of extension portion 78 is moved into the path of projection 84 on actuator bar 22 to prevent movement inwardly of the bar. Snap-switch 92 likewise is not operated when the mode selector control is in the record-ready condition.

To place the player-recorder 10 in the record mode subsequent to rotating the knob to the record-ready position, it is depressed in the direction of arrow 100 (FIG. 2) to move shaft 44 inwardly. When moved inwardly as described, against the force of spring 53, peripheral lip 64 of the cam member 60 engages projection 70 to rotate the interlock arm so that arm 98 is once again positioned out of the path of actuator bar 22. Depression of knob 50 in addition causes cam member 60 to engage the actuator arm 90 of snap-switch 92 to complete the enable circuit for solenoid 94 of the cartridge eject mechanism. Lip 64 captures interlock arm 66 in the last-mentioned position. Actuator bar 16 now may be depressed to drop cartridge 12 into the operating position.

Figure 7:
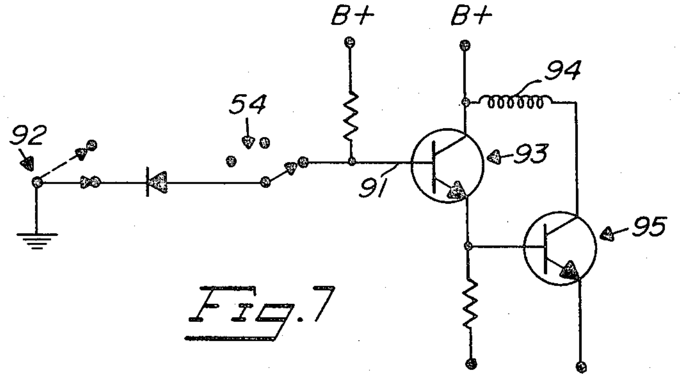
FIG. 7 is a schematic diagram of an actuating circuit for an eject solenoid incorporated in the player-recorder.

As will be seen in FIG. 7, engagement of actuator arm 90 by cam member 60, moves the arm 90 from a normal position (solid lines) whereat a ground potential is placed on the base electrode 91 of a transistor 93 connected in an emitter follower configuration and driving a second transistor 95 which in turn operates solenoid 94 of the cartridge eject mechanism 40. When actuator arm 90 is moved to the position shown in dotted lines, by engagement of cam member 60 therewith, the ground potential is removed from the base 92 of transistor 93 enabling the circuit for operation of solenoid or holding coil 94. It should be noted that rotary switch 54 is also included in the circuit. The rotary switch, through knob 50, must be positioned in a record-ready position prior to depression to complete the circuit between the snap-switch 92 and the eject mechanism solenoid. In the case wherein the rotary switch is positioned for playback, the eject mechanism solenoid or holding coil 94 is enabled through other circuitry (not shown) which does not include snap-switch 92.

The mode selector release mechanism 110 according to the invention is provided in player-recorder 10 for the removal of mode selector 42 from the record condition upon removal of a cassette from the operative or lowered position. The release of the mode selector in turn releases the holding circuit for the cassette eject mechanism, to permit operation of the latter.

Figure 8:
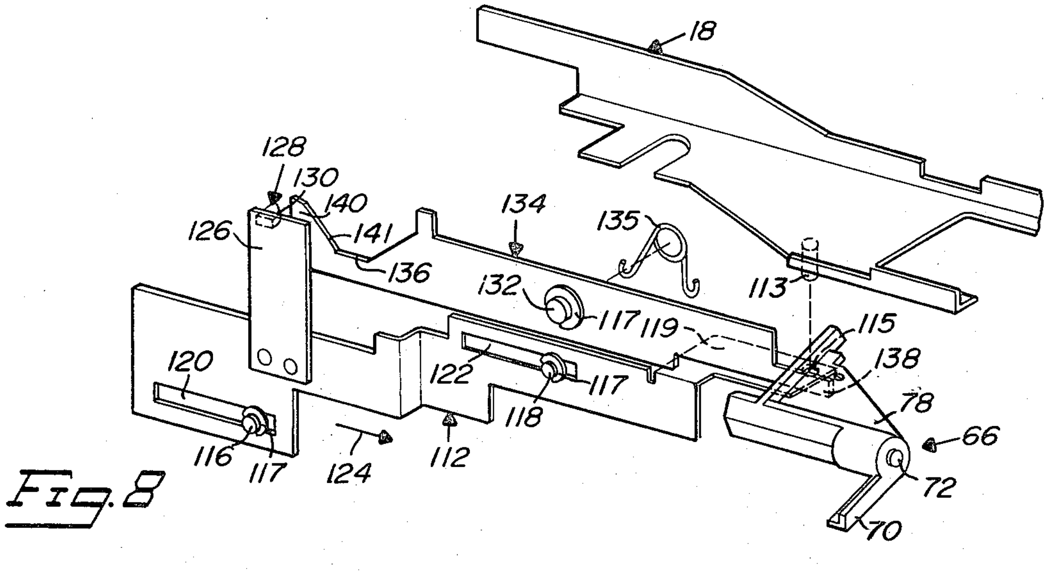
FIGS. 8 and 9 are perspective views of a mode control disengage lever arm and actuator cam included in the mode selector release mechanism according to the invention.
Figure 9:
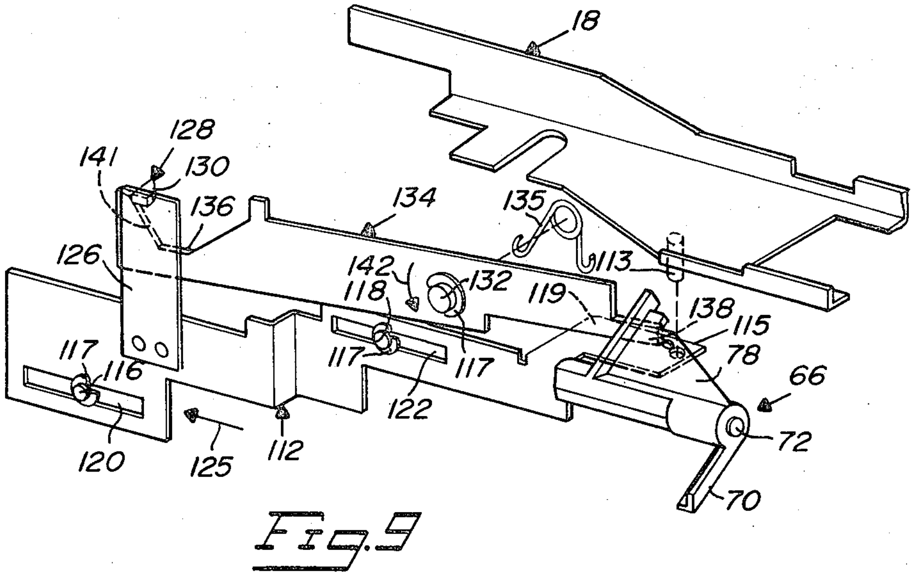

The mode selector release mechanism includes a slidable arm member 112 mounted on side wall 114 of the cassette player-recorder 10. Fasteners, such as pins 116, 118 extending from side wall 114 are received in elongated slots 120, 122 in the arm member 112. C washers 117 maintain the arm mounted on pins 116, 118. The arm member 112 is coupled to actuator arm 18 for movement therewith in response to the depression of knob 26. Referring to FIGS. 8 and 9, it can be seen that actuator arm 18 includes a pin member 113 received in an aperture 115 in an arm portion 119 extending from arm 112. Upon depression of knob 26 to move a cassette inserted into tunnel 11 into a lowered or dropped position, arm member 112 is moved in the direction of arrow 124 toward the front of the player-recorder to a release-ready position (See FIG. 8).

Depression of the actuator knob a second time to move the cassette from the lowered or operative position, moves the arm member 112 in the direction of arrow 125, (FIG. 9) back to its original position. The last described movement, as will be explained hereinafter, serves to release the mode selector from the record position if the latter had been so positioned.

A leaf spring 126 including a nylon projection 128 mounted on a free end thereof is attached to arm member 112 for movement therewith. The nylon projection includes an inclined surface 130 at one side thereof.

Figure 2:
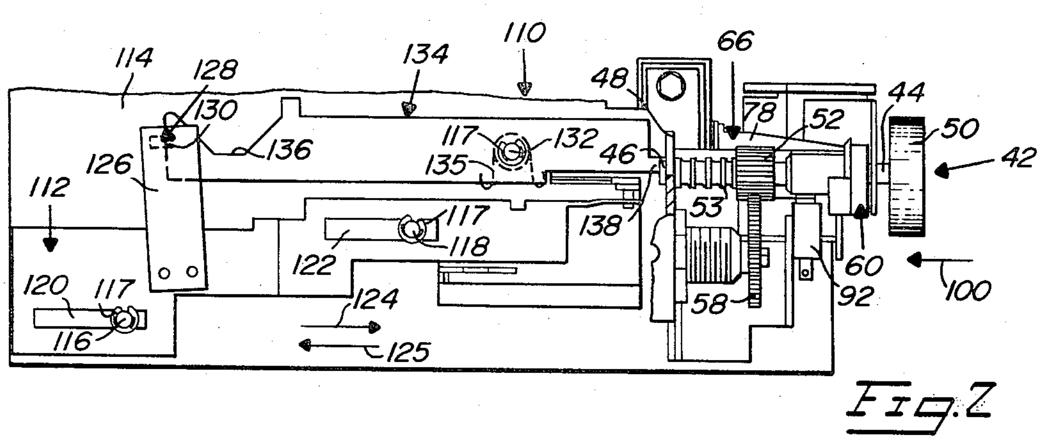
FIG. 2 is a side view of the player-recorder of FIG. 1 illustrating the cam and lever arm arrangement of the mode selector release mechanism according to the invention.

Mounted adjacent slidable arm member 112 on a pin member 132 extending from wall 114, is a lever arm 134. A C washer 117 likewise maintains the lever arm on pin 132. The lever arm is pivotal about pin 132 and includes at a first end thereof a notch 136 located for co-operation with projection 128 of slidable arm member 112. The opposite end of lever arm 134 includes a projection 138 positioned for engagement with extension portion 78 of interlock arm 66. A spring member 135 biases the lever arm in a clockwise direction as seen in FIGS. 2, 8 and 9.

For purposes of affording a more complete understanding of the invention, it is advantageous now to provide a functional description of the mode in which the component parts thus far described co-operate.

When operating the player-recorder in the record mode, mode selector knob 50 (FIG. 1) is rotated in a clockwise direction as viewed in the drawings to the record-ready position (See FIG. 5). Depression of the knob 50 thereafter causes the engagement of lip 64 of the cam member 60 with projection 70 of interlock arm 66, rotating the latter in a counterclockwise direction out of the path of the projection 84 on actuator arm 16. The cam member captures interlock arm in the last-mentioned position and is likewise held thereby against the tension of spring 53 in the depressed or record condition. When in the record condition, cam member 60 engages armature 90 of snap-switch 92 to close the circuit to holding solenoid 94, thereby to enable the eject mechanism circuitry.

Subsequent to the receipt of a cassette or cartridge in carriage 12, the knob 26 on actuator bar 16 is depressed (FIG. 1). Depression of the last-mentioned knob moves bar 16 inwardly to drop the cassette in carriage 12 into the tape drive spindles or to an operative position. In addition, slidable arm member 112 which is coupled to actuator arm 18 as described, is moved in the direction of arrow 124 (FIG. 8) to a release-ready position, whereby projection 128 is moved into notch 136 in lever arm 134. The lever arm 134 is not pivoted by the movement of projection 128 past leg 140 of the lever arm. Instead, leaf spring 126 is forced outwardly therefrom and the inclined surface 130 of the projection rides smoothly over leg 140 to prevent any movement in the lever arm. Biasing spring 135 likewise aids in maintaining lever arm 134 stationary at this time.

During the recording of information on a magnetic tape within the cassette lowered into the operating position, the relation of the slidable arm 112 and lever arm 134 remains constant.

When carriage 12 is moved from the operative to an inoperative position, such as, for example, by depression of actuator bar 16 a second time, actuating arm 18 is moved in accordance therewith in the direction opposite arrow 36 and likewise slidable arm member 112 coupled thereto is moved in the direction of arrow 125 (FIG. 9) for releasing the mode selector.

Movement of the slidable arm as described, causes projection 128 to engage the inclined surface 141 of leg 140 of lever arm 134 as the projection is moved past leg 140, thereby pivoting the last-mentioned arm in a counterclockwise direction (arrow 142) as seen in FIG. 9 against the force of spring member 135. Pivotal movement of the lever arm 134 causes end 138 thereof to engage extension portion 78 of interlock arm 66, disengaging projection 70 thereof and lip 64 of cam member 60. Upon being released, cam member 60 is forced outwardly of player-recorder 10 by the action of spring 53 to move the selector to the record-ready position and the armature 90 of the snap-action switch 92 to the position shown in solid lines in FIG. 7, thereby breaking the holding circuit to solenoid 94. Spring member 135 thereafter returns lever arm 134 to its original or normal position.

With the mode selector removed from the record position, it is not possible to maintain another cassette in the player-recorder without depressing the mode selector knob 50 once again because the snap-switch 92 remains in a condition to maintain the holding circuit for solenoid 94 de-energized.

Thus, if one inadvertently attempts to insert a tape cassette for playback without first removing the mode selector from the record-ready condition, the cassette will not be accepted by the player-recorder. The latter safety feature prevents loss of recorded information on pre-recorded cassettes which are inserted into the player-recorder without first moving the mode selector to a playback condition.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. A tape player-recorder adapted to receive a cassette for recording and playing back information on a tape therein, including in combination; means for receiving said cassette, said means including a carriage member movable between a first, inoperative position and a second, operative position, actuator means coupled to said cassette receiving means and operable to move said carriage member between said first and second positions, mode selector means for selecting the mode of operation of said tape player-recorder, including a selector member movable between non-record and record positions, and mode selector release means coupled to said actuator means and movable to a release-ready position upon operating said acutator means to move said carriage member from said inoperative to said operative position and to a release position for engagement with said mode selector to move the latter from a record to a non-record position upon operating said actuator means to move said carriage member from said operative to said inoperative position.

2. A tape player-recorder as claimed in claim 1 wherein said mode selector member is movable from a released, non-record position to a depressed, record position, and includes biasing means for biasing said member toward said non-record position, wherein said mode selector release means further includes a member movable in a first direction for engagement with said mode selector member upon depression of the latter to maintain said member in the record position and being movable in the opposite direction to release said mode selector member, and wherein said mode selector release means includes a lever arm member pivotal into engagement with said movable mode selector release member to move the latter in said opposite direction for releasing said mode selector member in response to the operation of said actuator means to move said carriage member from said operative to said inoperative position.

3. A tape player-recorder as claimed in claim 2 wherein said mode selector release means further include a slidable arm member coupled to said actuator means and movable in a first direction in response to the operation of said actuator means to move said carriage member from said inoperative to said operative position and movable in a second direction in response to the operation of said actuator means to move said carriage member from said operative to said inoperative position, said arm member including resiliently mounted projection means attached thereto for engagement with said lever arm member, said resiliently mounted projection means sliding across said lever arm member for movement into a predetermined relation with respect thereto upon movement of said slidable arm in said first direction and engaging said lever arm member to pivot the latter for releasing said mode selector member upon movement of said slidable arm in said second direction.

4. A tape player-recorder as claimed in claim 3 further including, cassette eject means operable to an eject-ready condition upon movement of said carriage member from said first to said second position and including a holding solenoid energizable electrically upon operation of said eject means to said eject-ready condition to maintain said eject means in said last-mentioned condition and switch means operable from a first to a second condition for completing a circuit connection to said holding solenoid in response to the movement of said mode selector member to the record position, said circuit connection being interrupted by the release of said mode selector member to de-energize said solenoid, thereby to operate said eject means from said eject-ready condition to an eject condition, whereby said cassette is ejected from said player-recorder.

5. A tape player-recorder adapted to receive a cassette for recording and playing back information on the tape therein, including in combination; tape playing and recording instrumentalities for playing back and recording information on said tape, respectively, a carriage member for receiving a cassette inserted into said player-recorder, said carriage member movable between a first position whereat said cassette is in an operative position adjacent said instrumentalities and a second position whereat said cassette is located remotely from said tape playing and recording instrumentalities, actuator means including an actuator member coupled to said carriage and movable between first and second positions for moving said carriage to said first and second positions, respectively, mode selector means for selecting the mode of operation of said player-recorder including a pushbutton member depressible from a first, non-record to a second, record position, and a biasing spring coupled to said member for biasing the latter toward said non-record position, and mode selector release means for removing said mode selector member from said record position in response to the movement of said carriage member from said operable position to said remote position, said mode selector release means including a pivotal member engageable with said mode selector member upon moving the latter to the depressed, record position to maintain the mode selector member in said record position, an arm member coupled to said actuator member and movable therewith between a first position and a second position in accordance with the movement of said actuator member and a lever arm mounted for pivotal movement adjacent said movable arm member with a first end thereof positioned for engagement with said pivotal member of said mode selector release means, said movable arm member including a cam member mounted thereon, said cam member being moved into a predetermined relation with respect to said lever arm in response to the movement of said arm member to said first position and engageable with said lever arm to pivot the latter for engagement with said pivotal member to release said mode selector member in response to the movement of said arm member to said second position.

6. A tape player-recorder as claimed in claim 5 wherein the pushbutton member of said mode selector means includes a cam member mounted thereon for movement with said pushbutton member, said cam member including a peripheral extension portion thereon, wherein said pivotal member includes a projection engageable with the extension portion of said cam member upon depression of the pushbutton member to maintain the last-mentioned member in a record condition and wherein upon engagement of said pivotal member by said lever arm to release said pushbutton mode selector member, said projection is rotated away from said extension portion of said cam member to release said pushbutton for return to a non-record position.

7. A tape player-recorder as claimed in claim 5 wherein the cam member of said movable arm member is mounted on a resilient member extending from said arm member, said cam member having a first inclined surface engageable with said lever arm upon moving said arm member to said first position, said cam member being slidable over said lever arm to avoid pivoting the latter and wherein said lever arm includes a notch formed therein into which said cam member is moved in response to the movement of said arm member to said first position, said cam member being moved out of said notch into enagement with said lever arm in response to the movement of said movable arm member to said second position for pivoting said lever arm.

8. A tape player-recorder as claimed in claim 7 wherein said lever arm includes a biasing spring attached thereto for biasing said lever arm normally out of engagement with said pivotal member, said biasing spring returning said lever arm to said normal position subsequent to pivoting the latter by said cam member.

* * * * *